US009765658B2

(12) United States Patent
Knauf et al.

(10) Patent No.: US 9,765,658 B2
(45) Date of Patent: Sep. 19, 2017

(54) VALVE TRAIN SYSTEM FOR AN INTERNAL COMBUSTION ENGINE

(75) Inventors: Michael B. Knauf, Rochester, NY (US); Mark C. Sellnau, Bloomfield Hills, MI (US)

(73) Assignee: DELPHI TECHNOLOGIES, INC., Troy, MI (US)

( * ) Notice: Subject to any disclaimer, the term of this patent is extended or adjusted under 35 U.S.C. 154(b) by 657 days.

(21) Appl. No.: 13/038,418

(22) Filed: Mar. 2, 2011

(65) Prior Publication Data

US 2012/0222639 A1 Sep. 6, 2012

(51) Int. Cl.
*F01L 13/00* (2006.01)
*F02D 13/02* (2006.01)
(Continued)

(52) U.S. Cl.
CPC .......... *F01L 13/0021* (2013.01); *F01L 1/185* (2013.01); *F01L 1/267* (2013.01); *F01L 13/0036* (2013.01); *F02D 13/0211* (2013.01); *F02D 13/0219* (2013.01); *F02D 13/0242* (2013.01); *F02D 13/0257* (2013.01); *F02D 13/0273* (2013.01); *F02M 26/01* (2016.02); *F01L 2800/10* (2013.01); *Y02T 10/18* (2013.01)

(58) Field of Classification Search
USPC .. 123/90.15, 295, 299, 568.14, 90.27, 90.39
See application file for complete search history.

(56) References Cited

U.S. PATENT DOCUMENTS 6,354,254 B1 3/2002 Usko
6,354,264 B1 * 3/2002 Iwakiri et al. ................ 123/305
(Continued)

FOREIGN PATENT DOCUMENTS

EP 1361344 A2 11/2003
GB 2447466 A 9/2008
(Continued)

OTHER PUBLICATIONS

European Search Report dated Dec. 19, 2012.
(Continued)

*Primary Examiner* — Phutthiwat Wongwian
*Assistant Examiner* — Jason T Newton
(74) *Attorney, Agent, or Firm* — Joshua M. Haines

(57) ABSTRACT

A valve train system for an internal combustion engine includes an exhaust valve moveable between an exhaust closed position and an exhaust open position. A camshaft includes a main exhaust lobe for moving the exhaust valve between the exhaust closed position and the exhaust open position for expelling exhaust constituents from the combustion chamber and an exhaust rebreath lobe for moving the exhaust valve between the exhaust closed position and the exhaust open position for allowing exhaust constituents into the combustion chamber. A two-step device is provided for transmitting motion from the camshaft to the exhaust valve and is switchable between a motion transmitting position and a motion preventing position such that the motion transmitting position allows motion to be transmitted from the exhaust rebreath lobe to the exhaust valve and the motion preventing position prevents motion from being transmitted from the exhaust rebreath lobe to the exhaust valve.

12 Claims, 12 Drawing Sheets

(51) Int. Cl.
   *F01L 1/18*     (2006.01)
   *F01L 1/26*     (2006.01)
   *F02M 26/01*    (2016.01)

(56) References Cited

U.S. PATENT DOCUMENTS

| | | | |
|---|---|---|---|
| 6,668,779 B2 * | 12/2003 | Hendriksma et al. | 123/90.44 |
| 6,941,910 B2 | 9/2005 | Methley | |
| 7,021,277 B2 * | 4/2006 | Kuo et al. | 123/299 |
| 7,152,559 B2 * | 12/2006 | Kuo et al. | 123/90.15 |
| 7,162,983 B1 | 1/2007 | Raghavan et al. | |
| 7,263,968 B2 | 9/2007 | Cairns et al. | |
| 7,290,524 B2 * | 11/2007 | Kobayashi | 123/315 |
| 7,308,872 B2 * | 12/2007 | Sellnau et al. | 123/90.16 |
| 2004/0134449 A1 * | 7/2004 | Yang | 123/27 R |
| 2005/0000485 A1 * | 1/2005 | Kuo et al. | 123/299 |
| 2005/0000498 A1 | 1/2005 | Persson | |
| 2005/0066920 A1 | 3/2005 | Daigo et al. | |
| 2006/0005818 A1 * | 1/2006 | Kuo | F02D 13/0246 123/568.13 |
| 2006/0016417 A1 * | 1/2006 | Kuo et al. | 123/294 |
| 2007/0039577 A1 | 2/2007 | Hoffmann et al. | |
| 2008/0223321 A1 | 9/2008 | Methley | |
| 2008/0264392 A1 | 10/2008 | Sahlen | |
| 2009/0048762 A1 * | 2/2009 | Kang et al. | 701/103 |
| 2009/0205595 A1 | 8/2009 | Lee et al. | |
| 2010/0043737 A1 | 2/2010 | Elnick et al. | |
| 2010/0242878 A1 | 9/2010 | Maekawa | |
| 2015/0128890 A1 | 5/2015 | Cecur | |

FOREIGN PATENT DOCUMENTS

| | | |
|---|---|---|
| WO | 0061930 A1 | 10/2000 |
| WO | 03067067 A1 | 8/2003 |
| WO | 2006007817 A1 | 1/2006 |
| WO | 2006028410 A1 | 3/2006 |

OTHER PUBLICATIONS

U.S. Appl. No. 12/637,822.
Dipl-Ing Stefan Pritze, Dipl-Ing Achim Konigstein, Adam Open GmbH, Russelsheim Germany; Allen Rayl, MSEE, Chen-Feng PHD ME, Paul Najt MSME Prof Dr. Ing,Uwe Grebe; General Motors LLC Warren/Pontiac USA; GM'S HCCI—In-Vehicle Experience With a Future Combustion System.
Manuel A. Gonzalez; GM Powertrain Advanced Diesel; Sep. 29, 2010; Deer Conference 2010; "Late Intake Valve and Exhaust Rebreathing in a V8 Diesel Engine for High Efficiency Clean Combustion" pp. 1-24.
Tim Lancefield, Nick Lawrence, Afif Ahmed, Hedi Ben Hadj Hamouda; SIA Conference on Variable Valve Actuation; Nov. 30, 2006; "VLD a flexibile, modular, cam operated VVA system giving variable valve lift and duration adn ctonrolled secondary valve openings"; pp. 1-10.
Dipl-Ing Jurgen Willand, Dipl-Ing Jan Jakobs, Dr. Emanuela Montefrancesco, Dr.-Ing Marc Daniel, Dipl-Ing Volker Vortkamp, MBE Dr-Ing Bernard Laer; Volkswagon Aktiengesellschaft, Wolfsburg; "The Volkswagen GCI Combustion System for Gasoline Engines—Potentials and Limits in CO2 Emissions";.

\* cited by examiner

VALVE TRAIN SYSTEM FOR AN INTERNAL COMBUSTION ENGINE

STATEMENT REGARDING FEDERALLY SPONSORED RESEARCH OR DEVELOPMENT

This invention was made with United States Government support under contract number DE-EE0003258 awarded by DOE. The United States Government has certain rights in this invention.

TECHNICAL FIELD OF INVENTION

The present invention relates to a valve train system for an internal combustion engine; more particularly to a valve train system for a gasoline direct injection compression ignition (GDCI) internal combustion engine; still more particularly to a valve train system for a GDCI internal combustion engine which allows exhaust constituents to enter a combustion chamber of the internal combustion engine through an exhaust valve; and still more particularly to such a valve train system which can selectively allow exhaust constituents to enter the combustion chamber through the exhaust valve and to vary the amount of exhaust constituents that enter the combustion chamber through the exhaust valve.

BACKGROUND OF INVENTION

Internal combustion engines employing advanced combustion processes are being developed in order to comply with evermore stringent fuel economy requirements and restrictions on emissions such as $CO_2$, $NO_x$, CO, hydrocarbons, and particulate matter. One such internal combustion engine employing an advanced combustion process is known as a gasoline direct injection compression ignition (GDCI) internal combustion engine which provides the high efficiency of a diesel internal combustion engine while using regular unleaded gasoline as the fuel. The GDCI process relies on controlled autoignition of gasoline fuel in a compression ignition engine. In the GDCI process, no gasoline is injected into the combustion chamber during the intake stroke. Rather, gasoline is injected into the combustion chamber late in the compression stroke. The gasoline and air rapidly mix and compression ignites the mixture in a controlled heat release process.

In order to achieve maximum fuel efficiency in a GDCI internal combustion engine, autoignition must occur over a wide range of operating loads, speeds, and temperatures. This includes using GDCI during cold starts, warm-up periods, and at light loads when autoignition using gasoline is very difficult to sustain. In order for autoignition to occur under these conditions in a GDCI internal combustion engine, special engine subsystems are needed to control conditions within the combustion chamber including pressure, temperature, air-fuel ratio, burned gas dilution, and charge motion. Additional heat may need to be added to the combustion chamber in order for the temperature therein to be sufficient to achieve autoignition. One method for introducing heat into the combustion chamber is to use negative valve overlap. When using negative valve overlap, camshaft phasers with large angular displacement are used to adjust the timing of the intake and exhaust valves to trap exhaust constituents in the combustion chamber by closing the exhaust valves prior to the end of the exhaust stroke. Conventional two-step actuation of the intake valves and exhaust valves may also be simultaneously employed to implement valve lift profiles that have been optimized for operation during negative valve overlap. However, such camshaft phasers and two-step actuation of the intake valves and exhaust valves can add significant cost and complexity to the valve train system. Additionally, using negative valve overlap negatively affects pumping work of the internal combustion engine and heat of the trapped exhaust constituents can be lost to the walls of the combustion chamber.

Another method for introducing heat into the combustion chamber is to open the intake valve during the exhaust stroke. This allows hot exhaust constituents into the intake system of the internal combustion engine which are then reintroduced into the combustion chamber during the subsequent intake stroke. This method can produce large amounts of hot residuals for mixture heating, but has the disadvantage of heating the walls of the intake port and runner.

Yet another method for introducing heat into the combustion chamber which may be more advantageous than using negative valve overlap or opening the intake valve during the exhaust stroke is to use exhaust rebreath. When using exhaust rebreath, hot exhaust constituents are introduced into the combustion chamber through the exhaust valve during the intake stroke. Exhaust rebreath does not compromise engine efficiency because exhaust constituents entering the cylinder during the intake stroke increases the pressure within the combustion chamber, thereby reducing the pumping loop. Using the exhaust rebreath method during cold starts may also reduce the time required to elevate the temperature of a catalyst in an exhaust treatment device sufficient to allow the catalyst to convert the exhaust species to less harmful constituents. This is because the exhaust temperature will be higher during exhaust rebreathing due to the decrease in intake air flow. The exhaust rebreath method is also helpful in maintaining temperature of the catalyst during deceleration conditions when fuel is shut off and also during low load conditions. In each of these conditions, the temperature of the catalyst may fall below the threshold required for the catalyst to convert the exhaust species to less harmful constituents.

U.S. Pat. No. 7,308,872 which is assigned to Applicant and incorporated herein by reference in its entirety teaches a valve train system which is useful in homogeneous charge compression ignition (HCCI) internal combustion engines. HCCI internal combustion engines mix air and fuel together in the intake stroke and compression of the mixture during the compression stroke will cause autoignition. U.S. Pat. No. 7,308,872 teaches an exhaust camshaft lobe for opening and closing an exhaust lobe of the valve train system to expel exhaust constituents from the combustion chamber. A portion of the exhaust lobe profile allows the exhaust lobe to be held open for a brief time period of the intake stroke to allow a small amount of exhaust rebreath. In this way, exhaust constituents are allowed to enter the combustion chamber through the exhaust valve. When used with a camshaft phaser, the duration of time the exhaust valve is open during the intake stroke can be varied. However, since the portion of the exhaust lobe profile that causes the exhaust rebreath is part of the main exhaust lobe that allows exhaust constituents to exit the combustion chamber, there is always some amount of rebreath of exhaust constituents. Additionally, the rebreath event must occur at the beginning of the intake stroke while some internal combustion engines may benefit from the rebreath event occurring near the end of the intake stroke.

What is needed is a valve train system that allows for varying amounts of rebreath of exhaust constituents. What is also needed is a valve train system that allows the rebreath of exhaust constituents to be discontinued when desired. What is also needed is a valve train system that allows the rebreath of exhaust constituents to occur near the end of the intake stroke.

SUMMARY OF THE INVENTION

Briefly described, a valve train system is provided for an internal combustion engine having a combustion chamber with a piston reciprocatable therewithin between a top-dead-center position and a bottom-dead-center position. The valve train system includes an intake valve which is moveable between an intake closed position and an intake open position for allowing a charge of at least air into the combustion chamber when the intake valve is in the intake open position. The intake valve is seated against an intake valve seat in the intake closed position and the intake valve is separated from the intake valve seat in the intake open position. The valve train system also includes a first exhaust valve moveable between an exhaust closed position and an exhaust open position for either expelling exhaust constituents from the combustion chamber or for selectively allowing exhaust constituents into the combustion chamber in the exhaust open position. The first exhaust valve is seated against a first exhaust valve seat in the exhaust closed position and the first exhaust valve is separated from the first exhaust valve seat in the exhaust open position. A camshaft includes a first main exhaust lobe for moving the first exhaust valve between the exhaust closed position and the exhaust open position for expelling exhaust constituents from the combustion chamber and a first exhaust rebreath lobe for moving the first exhaust valve between the exhaust closed position and the exhaust open position for allowing exhaust constituents into the combustion chamber. A first two-step device is provided for transmitting motion from the camshaft to the first exhaust valve and is switchable between a motion transmitting position for transmitting motion from the first exhaust rebreath lobe to the first exhaust lobe and a motion preventing position for preventing motion from being transmitted from the first exhaust rebreath lobe to the first exhaust valve.

Further features and advantages of the invention will appear more clearly on a reading of the following detailed description of the preferred embodiment of the invention, which is given by way of non-limiting example only and with reference to the accompanying drawings.

BRIEF DESCRIPTION OF DRAWINGS

This invention will be further described with reference to the accompanying drawings in which:

FIG. 2A is an enlarged view of the intake valve and intake valve seat of FIG. 2 shown in the intake closed position;

FIG. 2B is an enlarged view of the intake valve and intake valve seat of FIG. 2 shown in the intake open position;

FIG. 2C is an enlarged view of the exhaust valve and exhaust valve seat of FIG. 2 shown in the exhaust closed position;

FIG. 2D is an enlarged view of the exhaust valve and exhaust valve seat of FIG. 2 shown in the exhaust open position;

DETAILED DESCRIPTION OF INVENTION

Figure 1:
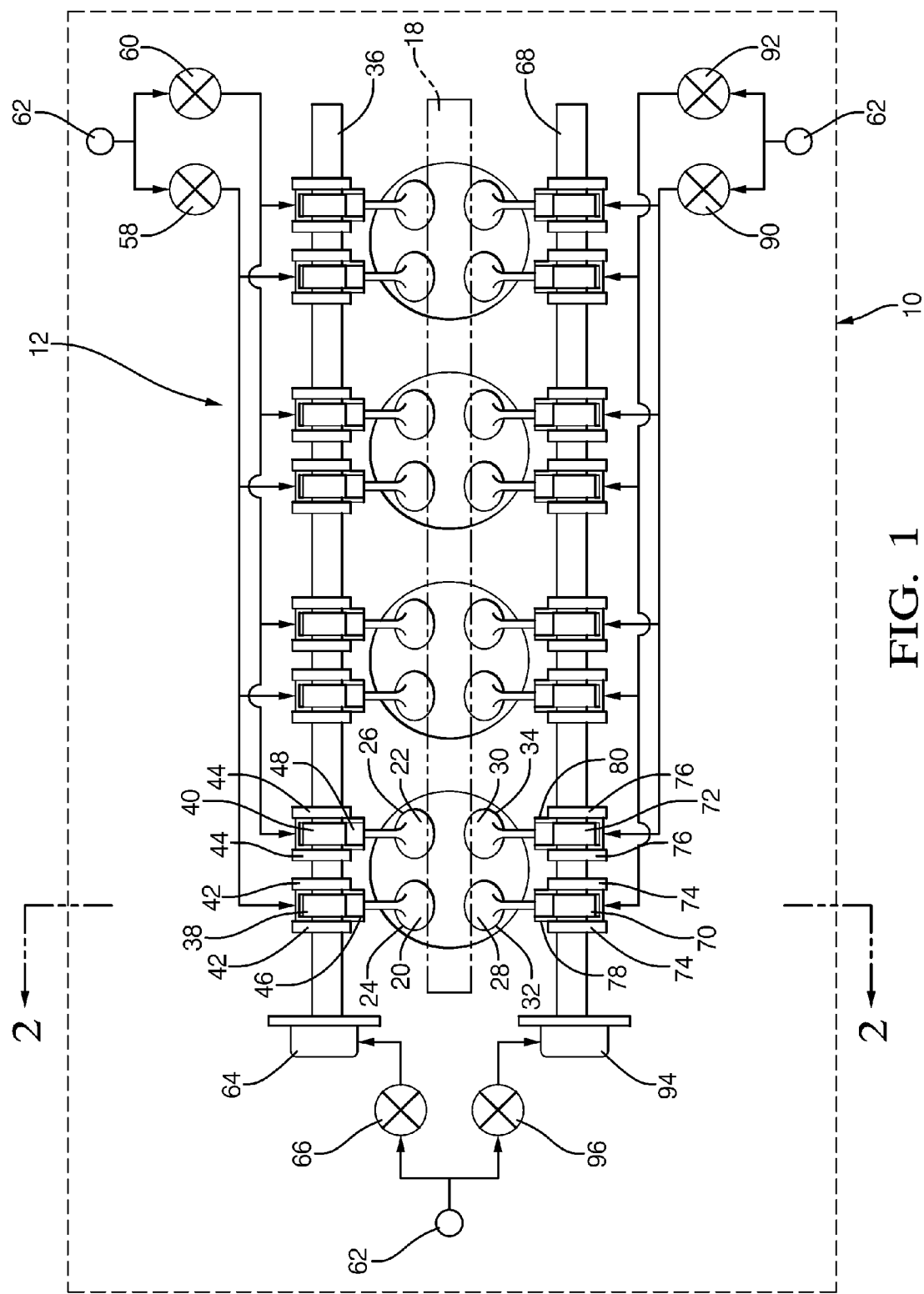
FIG. 1 is a schematic drawing of a four cylinder GDCI internal combustion engine in accordance with the invention.
Figure 2:
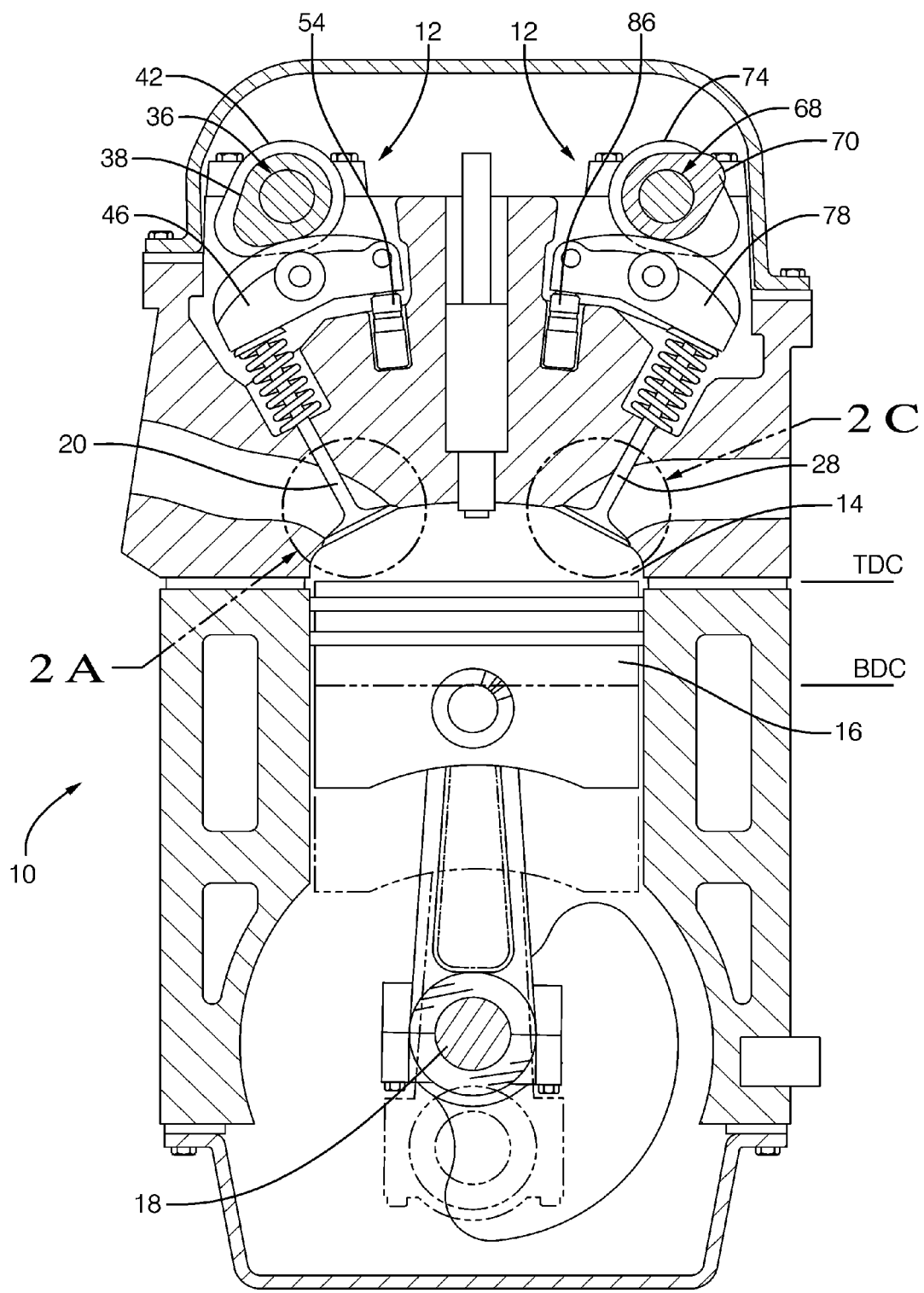
FIG. 2 is an elevation cross-sectional view of the GDCI internal combustion engine of FIG. 1 taken through section line 2-2.
Figure 2:
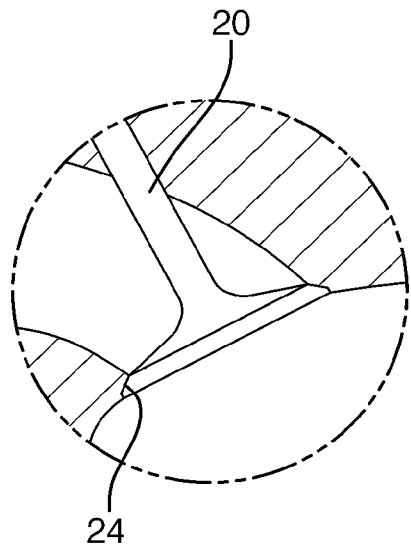
Figure 2:
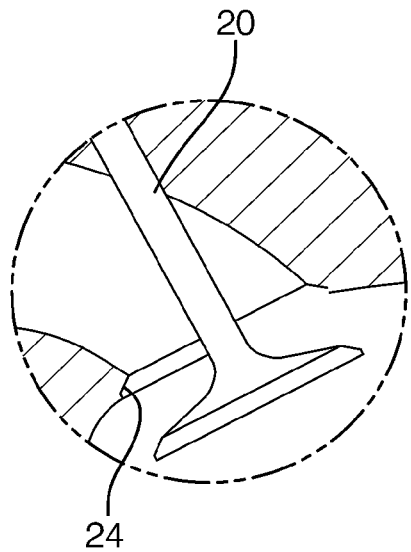
Figure 2:
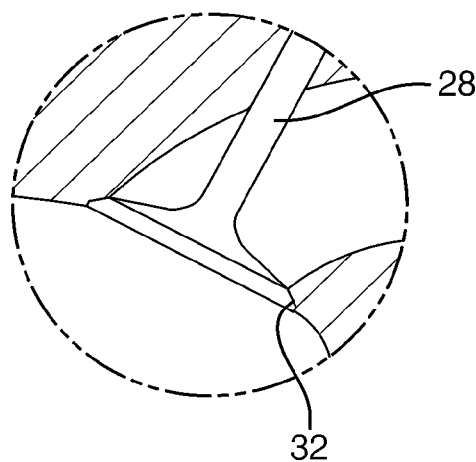
Figure 2:
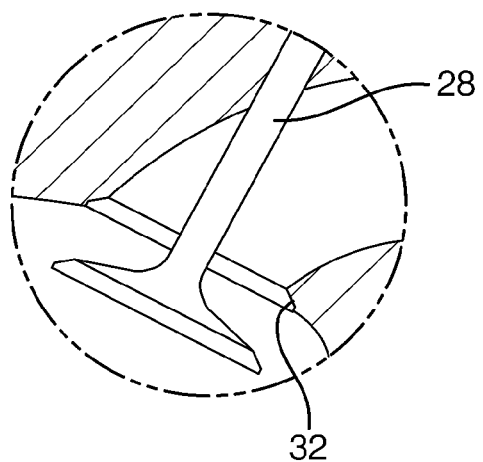

In accordance with a preferred embodiment of this invention and referring to FIGS. 1 and 2, GDCI internal combustion engine 10 is shown which includes valve train system 12 for allowing at least a charge of air into combustion chamber 14 and for allowing exhaust constituents into and out of combustion chamber 14. Piston 16 is disposed within combustion camber 14 and is reciprocatable between a top-dead-center (TDC) position (shown as solid lines in FIG. 2) and a bottom dead center (BDC) position (shown as phantom lines in FIG. 2). A lower end of piston 16 is attached to crankshaft 18 which turns reciprocating motion of piston 16 into rotary motion.

Now referring to FIGS. 1, 2, 2A, 2B, and 3; valve train system 12 includes first and second intake valves 20, 22 which are moveable between an intake open position as shown in FIG. 2B for allowing the charge of at least air into combustion chamber 14 and an intake closed position as shown in FIGS. 2 and 2A for substantially preventing fluid communication into and out of combustion chamber 14 through first and second intake valves 20, 22. When first and second intake valves 20, 22 are in the intake closed position, first and second intake valves 20, 22 are seated against first and second intake valve seats 24, 26 respectively.

Now referring to FIGS. 1, 2, 2C, 2D and 5; valve train system 12 also includes first and second exhaust valves 28, 30 which are moveable between an exhaust open position as shown in FIG. 2D and an exhaust closed position as shown in FIGS. 2 and 2C. The exhaust open position allows exhaust constituents to be expelled from combustion chamber 14 and also selectively allows exhaust constituents into combustion chamber 14. The exhaust closed position substantially prevents fluid communication into and out of combustion chamber 14 through first and second exhaust valves 28, 30. When first and second exhaust valves 28, 30 are in the exhaust closed position, first and second exhaust valves 28, 30 are seated against first and second exhaust valve seats 32, 34 respectively.

Figure 3:
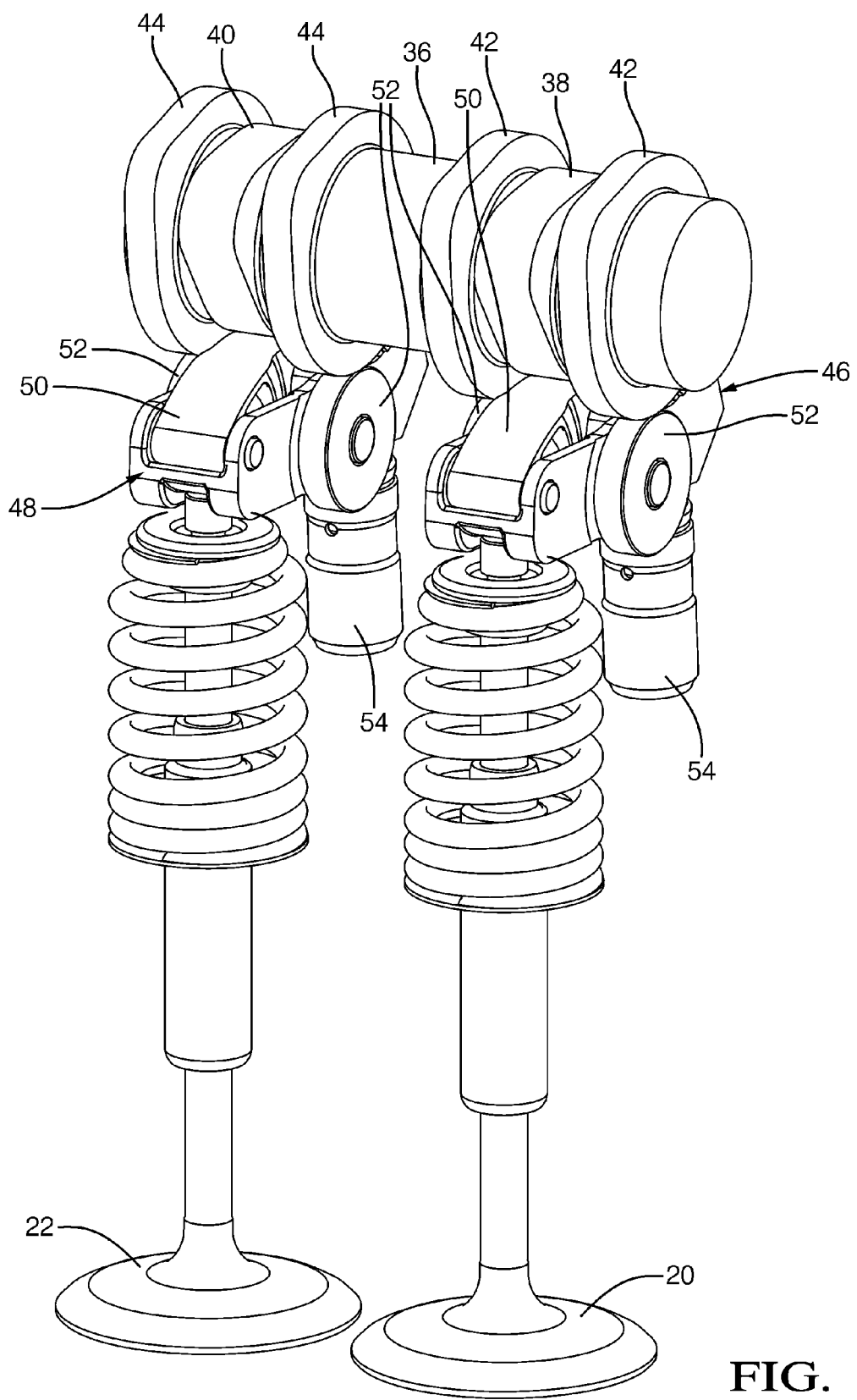
FIG. 3 is an isometric view of the intake valve train of the GDCI internal combustion engine of FIG. 1.

Now referring to FIGS. 1, 2, and 3; intake camshaft 36 is provided in valve train system 12 for moving first and second intake valves 20, 22 between the intake open and intake closed positions. Intake camshaft 36 may include first and second center high lift intake lobes 38, 40 such that first center high lift intake lobe 38 is associated with first intake valve 20 and second center high lift intake lobe 40 is associated with second intake valve 22. Intake camshaft 36 may also include first and second outer low lift intake lobe pairs 42, 44 such that first center high lift intake lobe 38 is disposed between first outer low lift intake lobe pair 42 and is associated with first intake valve 20 and second center high lift intake lobe 40 is disposed between second outer low lift intake lobe pair 44 and is associated with second intake valve 22.

First and second two-step intake devices 46, 48 may be provided to transmit motion from intake camshaft 36 to first and second intake valves 20, 22 respectively. An example of such first and second two-step intake devices are two-step roller finger followers as disclosed in U.S. Pat. No. 6,668,779 which is incorporated herein by reference in its entirety. First and second two-step devices 46, 48 are switchable between a locked and an unlocked position. In the locked position, center intake follower 50 is held at a fixed height with respect to outer intake followers 52 which are disposed on each side of center intake follower 50. In this way, first and second center high lift intake lobes 38, 40 act on their respective center intake follower 50. As intake camshaft 36 rotates, center intake follower 50 follows the profile of its respective center high lift intake lobe 38, 40. When center intake follower 50 follows the valve lifting portion of its center high lift intake lobe 38, 40, the two-step intake device pivots about intake lash adjuster 54, thereby lifting its respective intake valve 20, 22 from its respective intake valve seat 24, 26.

In the unlocked position, center intake follower 50 is not held at a fixed height with respect to outer intake followers 52. As center intake follower 50 follows the valve lifting portion of its center high lift intake lobe 38, 40, center intake follower 50 is allowed to compress which is known in the art as lost motion. In this way, center intake follower 50 does not cause the two-step intake device to pivot about intake lash adjuster 54 and therefore does not impart motion on its respective intake valve 20, 22. Since center intake follower 50 is allowed to compress, outer intake followers 52 are permitted to follow the profiles of their respective outer low lift intake lobe pairs 42, 44. As intake camshaft 36 rotates, outer intake followers 52 follow the profile of their respective outer low lift intake lobe pairs 42, 44. In this way, first and second intake valves 20, 22, are moved between the intake open and intake closed positions by their respective outer low lift intake lobe pairs 42, 44 rather than by their respective center high lift intake lobe 38, 40.

Figure 4:
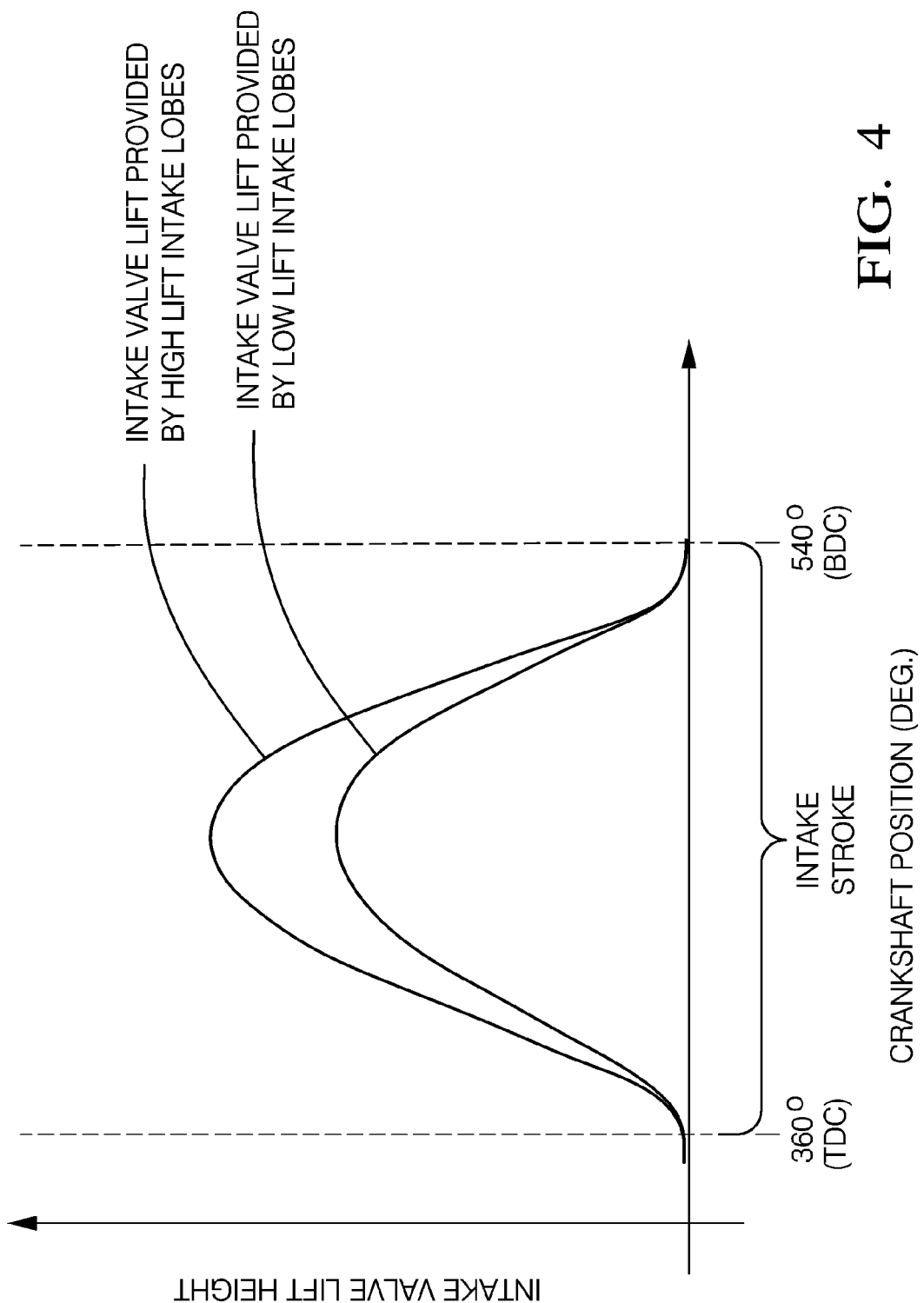
FIG. 4 is a graph showing the intake valve lift height provided by the high lift intake lobes and the low lift intake lobes.

It should be noted that in the locked position, first and second outer low lift intake lobe pairs 42, 44 do not affect the position of their respective intake valves 20, 22. This is because first and second center high lift intake lobes 38, 40 produce a larger valve lift than first and second outer low lift intake lobe pairs 42, 44 and also because the valve lifting portion of first and second center high lift intake lobes 38, 40 are azimuthally located on intake camshaft 36 at substantially the same position (same crank angle positions) as first and second outer low lift intake lobe pairs 42, 44. FIG. 4 is a graph illustrating the height first and second intake valves are lifted from their respective intake valve seats 24, 26 in both the locked and unlocked positions during the intake stroke.

First and second two-step intake devices 46, 48 are each provided with an intake lock mechanism (not shown). First and second two-step devices 46, 48 are placed in the unlocked position when pressurized oil from GDCI internal combustion engine 10 is supplied to the intake lock mechanism. In this way, center intake follower 50 is not held at a fixed height with respect to outer intake followers 52. First and second two-step intake devices 46, 48 are placed in the locked position when the pressurized oil is drained from the intake lock mechanism. The supply of pressurized oil to the intake lock mechanism for each two-step intake device 46, 48 may be controlled by first and second intake oil control valves 58, 60 respectively which both receive pressurized oil from oil supply 62. In this way, first and second two-step intake devices 46, 48 may both be simultaneously placed in the locked position or unlocked position or one of the first and second two-step intake devices 46, 48 may be placed in the locked position while the other of the first and second two-step intake devices 46, 48 is simultaneously in the unlocked position which may be useful, for example, for introducing swirl into combustion chamber 14 during the intake stroke of GDCI internal combustion engine 10.

Intake camshaft 36 may be provided with intake camshaft phaser 64 for varying the phase relationship between intake camshaft 36 and crankshaft 18. Intake camshaft phaser 64 may be actuated by pressurized oil from oil supply 62 which is controlled by intake phasing oil control valve 66. Alternatively, but not shown, intake camshaft phaser 64 may be actuated by an electric motor rather than pressurized oil.

Figure 5:
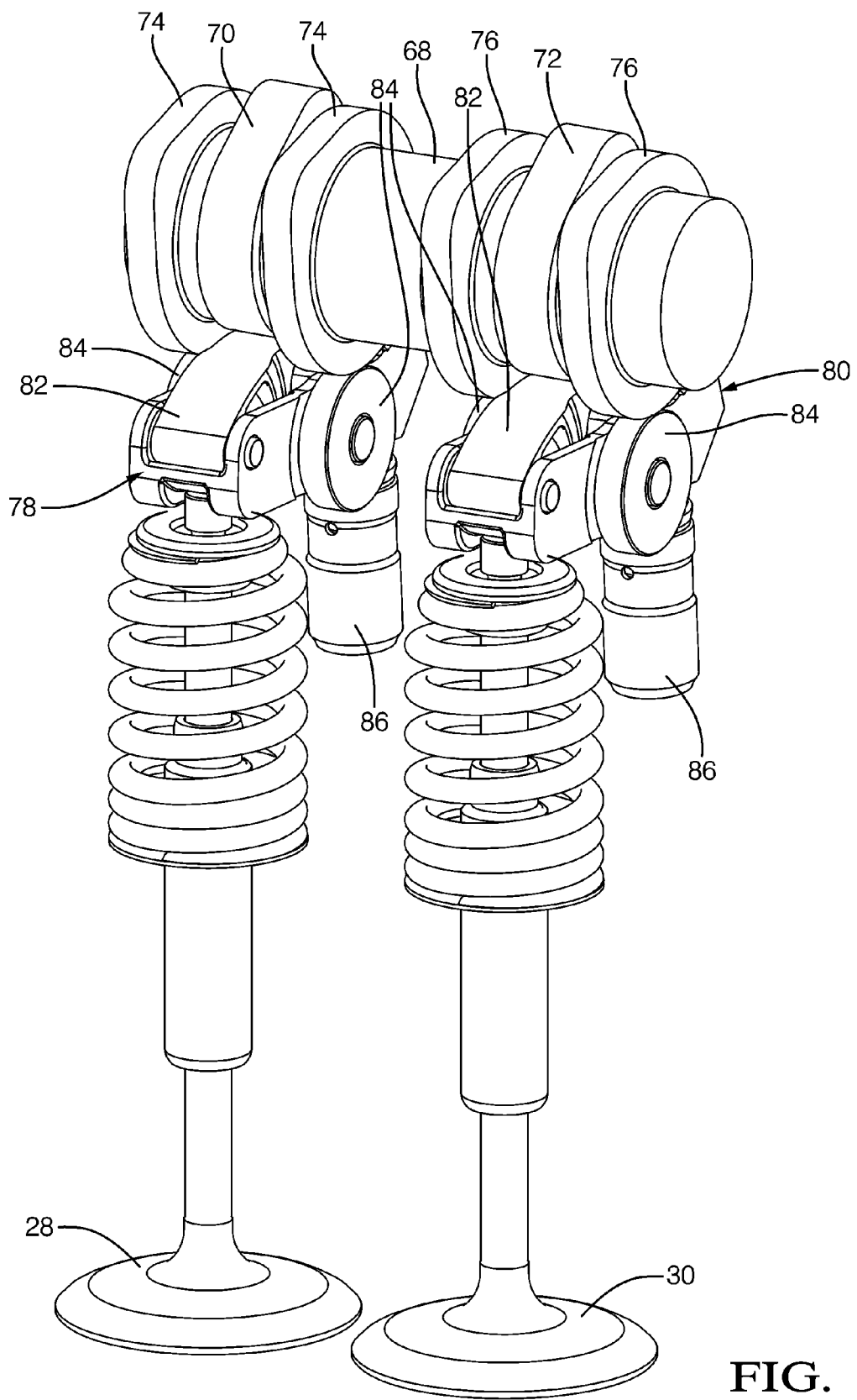
FIG. 5 is an isometric view of the exhaust valve train of the GDCI internal combustion engine of FIG. 1.

Now referring to FIGS. 1, 2, and 5; exhaust camshaft 68 is provided in valve train system 12 for moving first and second exhaust valves 28, 30 between the exhaust open and exhaust closed positions. Exhaust camshaft 68 includes first and second center exhaust rebreath lobes 70, 72 such that first center exhaust rebreath lobe 70 is associated with first exhaust valve 28 and second center exhaust rebreath lobe 72 is associated with second exhaust valve 30. Exhaust camshaft 68 also includes first and second outer main exhaust lobe pairs 74, 76 such that first center exhaust rebreath lobe 70 is disposed between first main exhaust lobe pair 74 and is associated with first exhaust valve 28 and second center exhaust rebreath lobe 72 is disposed between second main exhaust lobe pair 76 and is associated with second exhaust valve 30.

Figure 6:
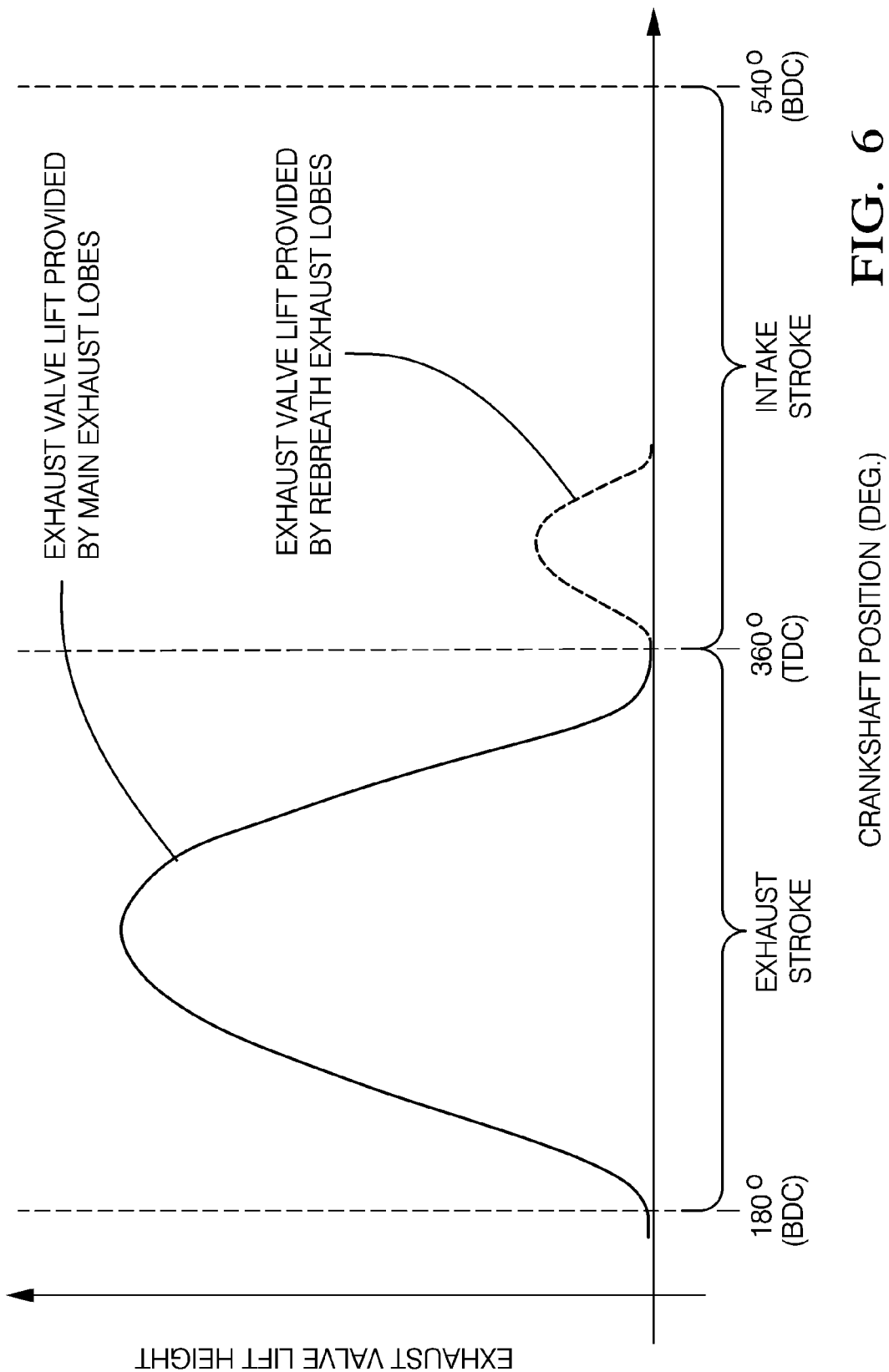
FIG. 6 is a graph showing the exhaust valve lift height when the two-step exhaust device is in the motion transmitting position.

First and second two-step exhaust devices 78, 80 are provided to transmit motion from exhaust camshaft 68 to first and second exhaust valves 28, 30 respectively. An example of such first and second two-step exhaust devices are two-step roller finger followers as disclosed in U.S. Pat. No. 6,668,779 which is incorporated herein by reference in its entirety. First and second two-step exhaust devices 78, 80 are switchable between a motion transmitting position and a motion preventing position. In the motion transmitting position, center exhaust rebreath follower 82 is held at a fixed height with respect to outer main exhaust followers 84 which are disposed on each side of center exhaust rebreath follower 82. In this way, first and second center exhaust rebreath lobes 70, 72 act on their respective center exhaust rebreath follower 82. As exhaust camshaft 68 rotates, center exhaust rebreath follower 82 follows the profile of its respective center exhaust rebreath lobe 70, 72. When center exhaust rebreath follower 82 follows the valve lifting portion of its respective center exhaust rebreath lobe 70, 72, the two-step exhaust device pivots about exhaust lash adjuster 86, thereby lifting its respective exhaust valve 28, 30 from its respective exhaust valve seat 32, 34. However, unlike first and second two-step intake devices 46, 48 in which first and second outer low lift intake lobe pairs 42, 44 do not affect the position of their respective intake valves 20, 22 when center intake follower 50 is held at a fixed height with respect to outer intake followers 52, outer main exhaust followers 84 of first and second two-step exhaust devices 78, 80 do affect the position of their respective exhaust valves 28, 30. This is because first and second center exhaust rebreath lobes 70, 72 produce a smaller valve lift than first and second outer main exhaust lobe pairs 74, 76 and also because the valve lifting portion of first and second center exhaust rebreath lobes 70, 72 are azimuthally located on exhaust camshaft 68 at substantially different positions (different crank angle positions) from the valve lifting portions of first and second outer main exhaust lobe pairs 74, 76 as will be discussed in more detail later. FIG. 6 is a graph illustrating the height first and second exhaust valves 28, 30 are lifted from their respective exhaust valve seats 32, 34 in the motion transmitting position.

Figure 7:
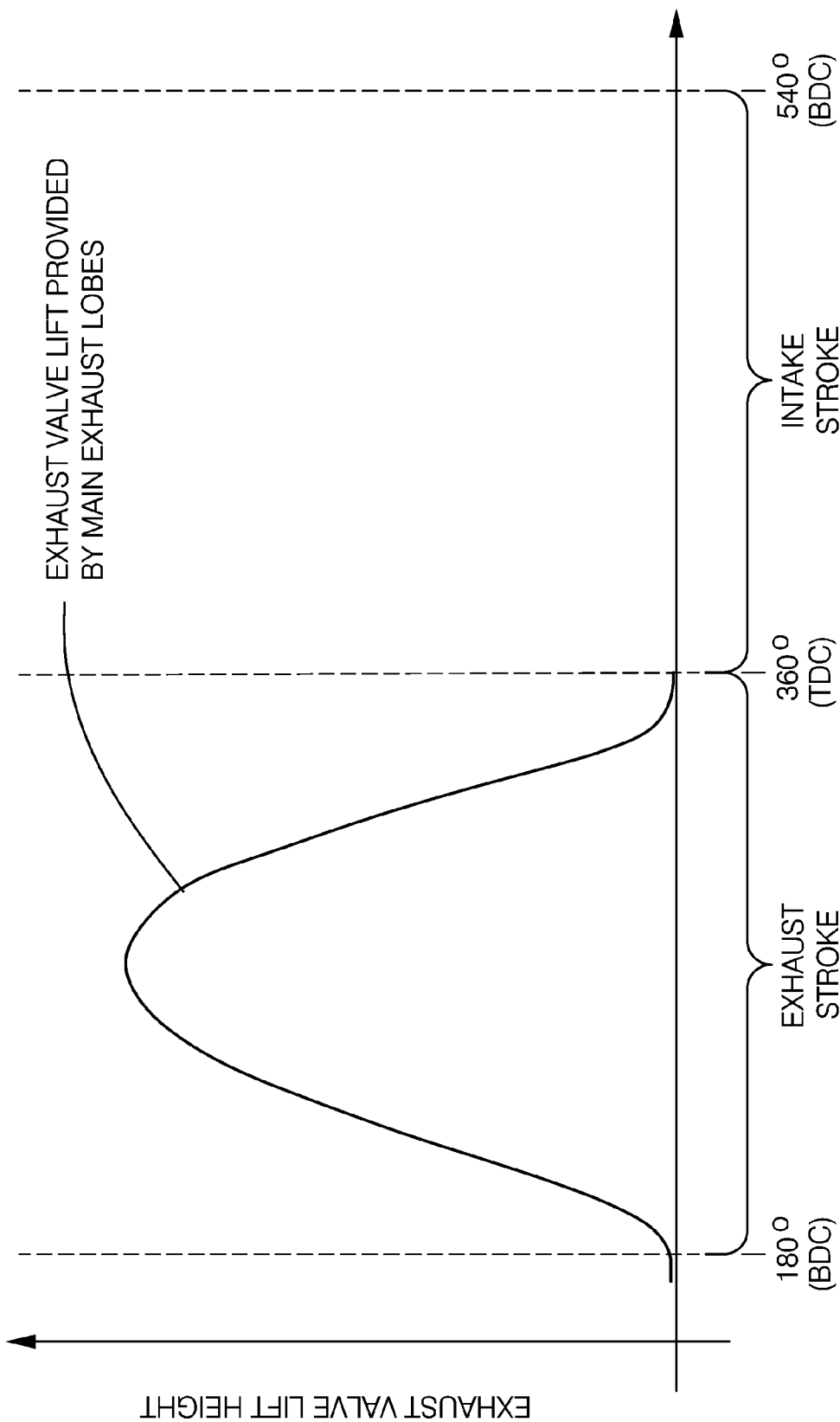
FIG. 7 is a graph showing the exhaust valve lift height when the two-step exhaust device is in the motion preventing position.

In the motion preventing position, center exhaust rebreath follower 82 is not held at a fixed height with respect to outer main exhaust followers 84. As center exhaust rebreath follower 82 follows the valve lifting portion of its respective center exhaust rebreath lobe 70, 72, center exhaust rebreath follower 82 is allowed to compress which is known in the art as lost motion. In this way, center exhaust rebreath follower 82 does not cause the two-step exhaust device to pivot about exhaust lash adjuster 86 and therefore does not impart motion on its respective exhaust valve 28, 30. As exhaust camshaft 68 rotates, outer main exhaust followers 84 follow the profile of their respective outer main exhaust lobes pairs 74, 76. In this way, first and second exhaust valves 28, 30 are moved between the exhaust open and exhaust closed positions only by their respective outer main exhaust lobe pairs 74, 76. FIG. 7 is a graph illustrating the height first and second valves 28, 30 are lifted from their respective exhaust valve seats 32, 34 in the motion preventing position.

First and second two-step exhaust devices 78, 80 are each provided with an exhaust lock mechanism (not shown). First and second two-step exhaust devices 78, 80 are placed in the motion preventing position when pressurized oil from GDCI internal combustion engine 10 is supplied to the exhaust lock mechanism. In this way, center exhaust rebreath follower 82 is not held at a fixed height with respect to outer main exhaust followers 84. First and second two-step exhaust devices 78, 80 are placed in the motion transmitting position when the pressured oil is drained from the exhaust lock mechanism which may be desirable because the motion transmitting position may be the default position for first and second two-step exhaust devices 78, 80. This causes exhaust rebreath to begin immediately upon starting of GDCI internal combustion engine 10 which may be desirable for operating a cold engine. The supply of pressurized oil to the exhaust lock mechanism for each two-step exhaust device 78, 80 may be controlled by first and second exhaust oil control valves 90, 92 respectively which both receive pressurized oil from oil supply 62. In this way, first and second two-step exhaust devices 78, 80 may both be simultaneously placed in the motion transmitting position or motion preventing position or one of the first and second two-step exhaust devices 78, 80 may be placed in the motion transmitting position while the other of the two-step exhaust devices 78, 80 may be simultaneously placed in the motion preventing position which may be useful, for example, for providing varying amounts of exhaust rebreath to combustion chamber 14. More specifically, if a lesser amount of rebreath is desired, one of the first and second two-step exhaust devices 78, 80 may be placed in the motion transmitting position while the other of the two-step exhaust devices 78, 80 may be placed in the motion preventing position. Since only one of the first and second exhaust valves 28, 30 is opened during the intake stroke, a lesser amount exhaust constituents is introduced into combustion chamber 14 as compared to the amount of exhaust constituents that is introduced into combustion chamber 14 when both first and second two-step exhaust devices 78, 80 are placed in the motion transmitting position.

As mentioned previously, the valve lifting portion of first and second center exhaust rebreath lobes 70, 72 are azimuthally located at substantially different positions from the valve lifting portion of first and second outer main exhaust lobe pairs 74, 76. The valve lifting portions of first and second outer main exhaust lobe pairs 74, 76 are conventional exhaust lobes and are therefore azimuthally positioned on exhaust camshaft 68 such that first and second exhaust valves 28, 30 are in the exhaust open position when piston 16 is moving from bottom dead center to top dead center during the exhaust stroke of combustion chamber 14. However, the valve lifting portion of first and second center exhaust rebreath lobes 70, 72 are azimuthally positioned to move first and second exhaust valves 28, 30 to the exhaust open position at a different position of piston 16. Specifically, first and second center exhaust rebreath lobes 70, 72 move first and second exhaust valves 28, 30 to the exhaust open position when piston 16 is moving from top dead center toward bottom dead center during the intake stroke of piston 16. In this way, exhaust constituents are introduced into combustion chamber 14 through first and second exhaust valves 28, 30 in order to add heat to combustion chamber 14 which aids in autoignition.

It should be noted that friction benefits can be realized by not providing first and second center exhaust rebreath lobes 70, 72 with an additional profile to produce the main exhaust event when first and second two-step exhaust devices 78, 80 are placed in the motion transmitting position. This is because the main exhaust event is provided by first and second outer main exhaust lobe pairs 74, 76 which are followed by outer main exhaust followers 84 which are rollers. The rollers provide less friction in operation than a sliding interface such as provided by first and second center exhaust rebreath lobes 70, 72 being followed by center exhaust rebreath follower 82.

Figure 8:
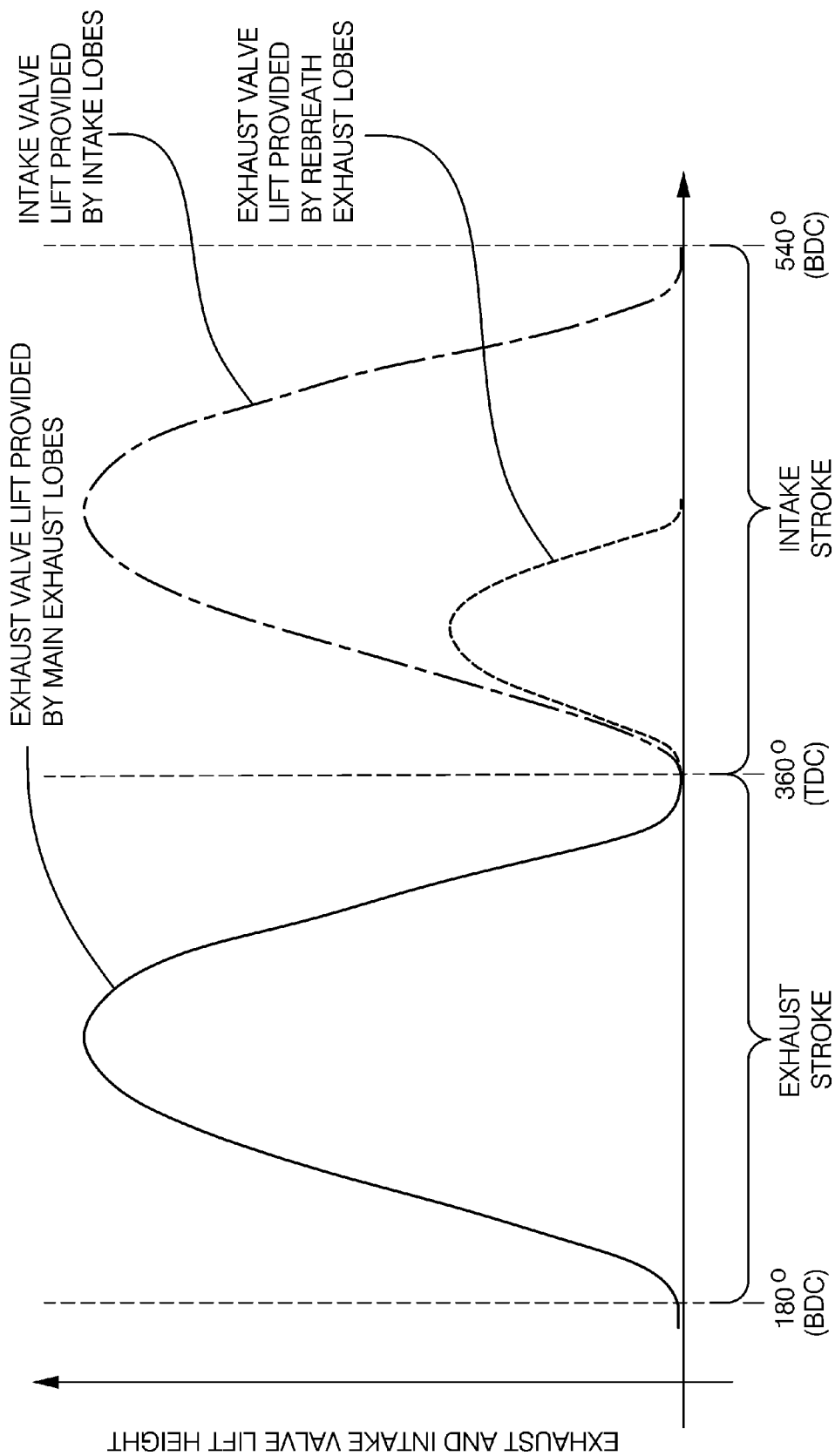
FIG. 8 is a graph showing the exhaust valve lift height and the intake valve lift height when the two-step exhaust device is in the motion transmitting position and the exhaust rebreath lobe is located to open the exhaust valves at substantially the same time as the intake valve.

As is well known in the art of internal combustion engines, the intake stroke of a piston is the stroke in which a charge of at least air is introduced into the combustion chamber through the intake valves. As is also well known in the art of internal combustion engines, first and second intake valves 20, 22 are moving away from their respective intake valve seats 24, 26 during a portion of the intake stroke and first and second intake valves 20, 22 are moving toward their respective intake valve seats 24, 26 during another portion of the intake stroke. In one preferred embodiment, the valve lifting portion of first and second center exhaust rebreath lobes 70, 72 may be azimuthally positioned on exhaust camshaft 68 to lift first and second exhaust valves 28, 30 from their respective exhaust valve seats 32, 34 at substantially the same time that first and second intake valves 20, 22 are lifted from their respective exhaust valve seats 32, 34. In this way, first and second exhaust valves 28, 30 move away from exhaust valve seats 32, 34 while first and second intake valves 20, 22 are moving away from first and second intake valve seats 24, 26. Furthermore, the valve lifting portion of first and second center exhaust rebreath lobes 70, 72 may be azimuthally positioned to bring first and second exhaust valves 28, 30 into contact with their respective exhaust valve seats 32, 34 before first and second intake valves 20, 22 are brought into contact with their respective intake valve seats 24, 26. FIG. 8 is a graph illustrating the valve lift heights of first and second intake valves 20, 22 and first and second exhaust valves 28, 30 in the arrangement of this embodiment.

Figure 9:
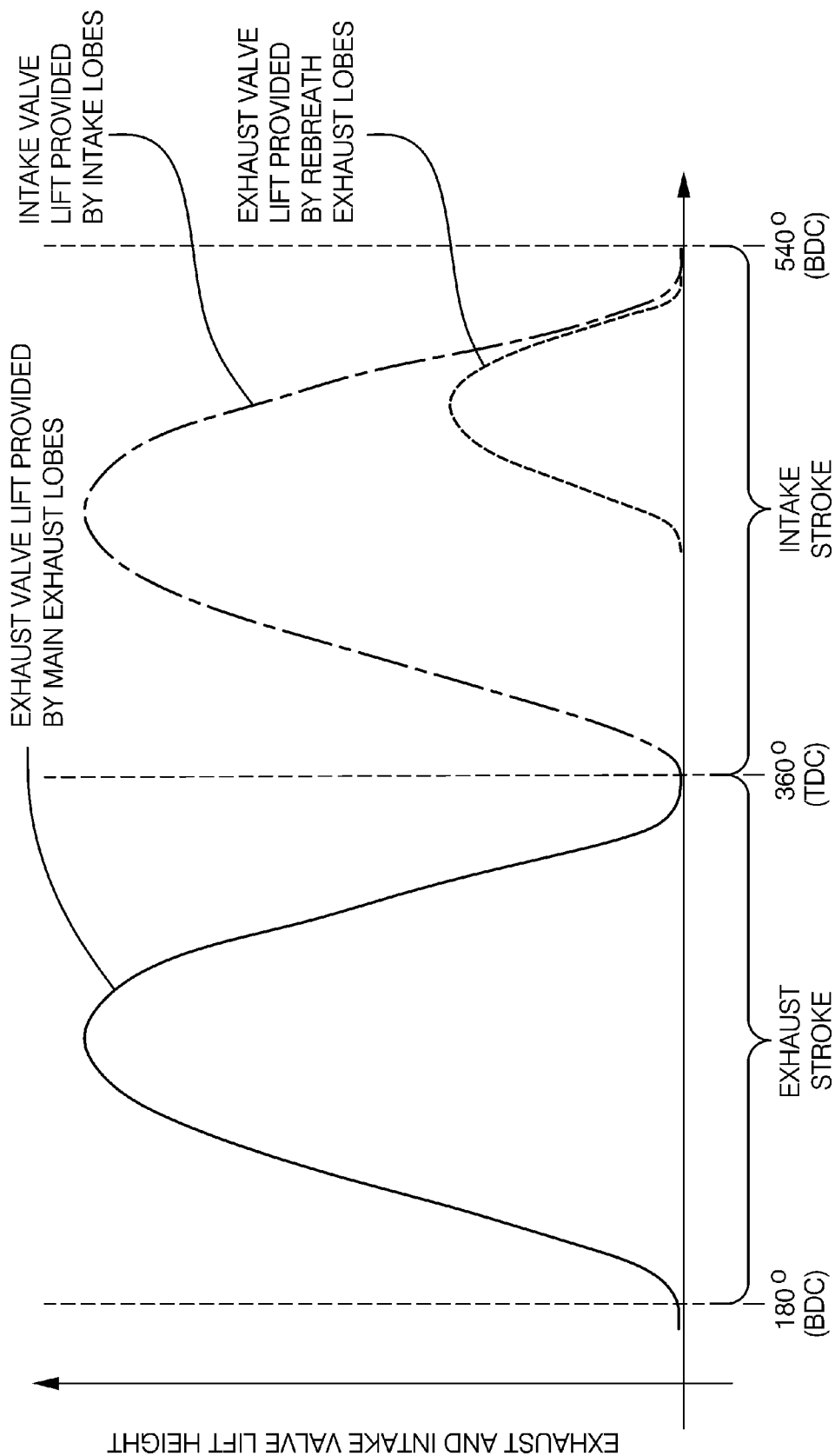
FIG. 9 is a graph showing the exhaust valve lift height and the intake valve lift height when the two-step exhaust device is in the motion transmitting position and the exhaust rebreath lobe is located to close the exhaust valves at substantially the same time as the intake valve.

In another preferred embodiment, the valve lifting portion of first and second center exhaust rebreath lobes 70, 72 may be azimuthally positioned on exhaust camshaft 68 to bring first and second exhaust valves 28, 30 into contact with their respective exhaust valve seats 32, 34 at substantially the same time that first and second intake valves 20, 22 are brought into contact with their respective intake valve seats 24, 26. In this way, first and second exhaust valves 28, 30 move toward exhaust valve seats 32, 34 while first and second intake valves 20, 22 are moving toward first and second intake valve seats 24, 26. Furthermore, the valve lifting portion of first and second center exhaust rebreath lobes 70, 72 may be azimuthally positioned to lift first and second exhaust valves 28, 30 from their respective exhaust valve seats 32, 34 substantially after first and second intake valves 20, 22 have been lifted from their respective intake valve seats 24, 26. FIG. 9 is a graph illustrating the valve lift heights of first and second intake valves 20, 22 and first and second exhaust valves 28, 30 in the arrangement of this embodiment.

Figure 10:
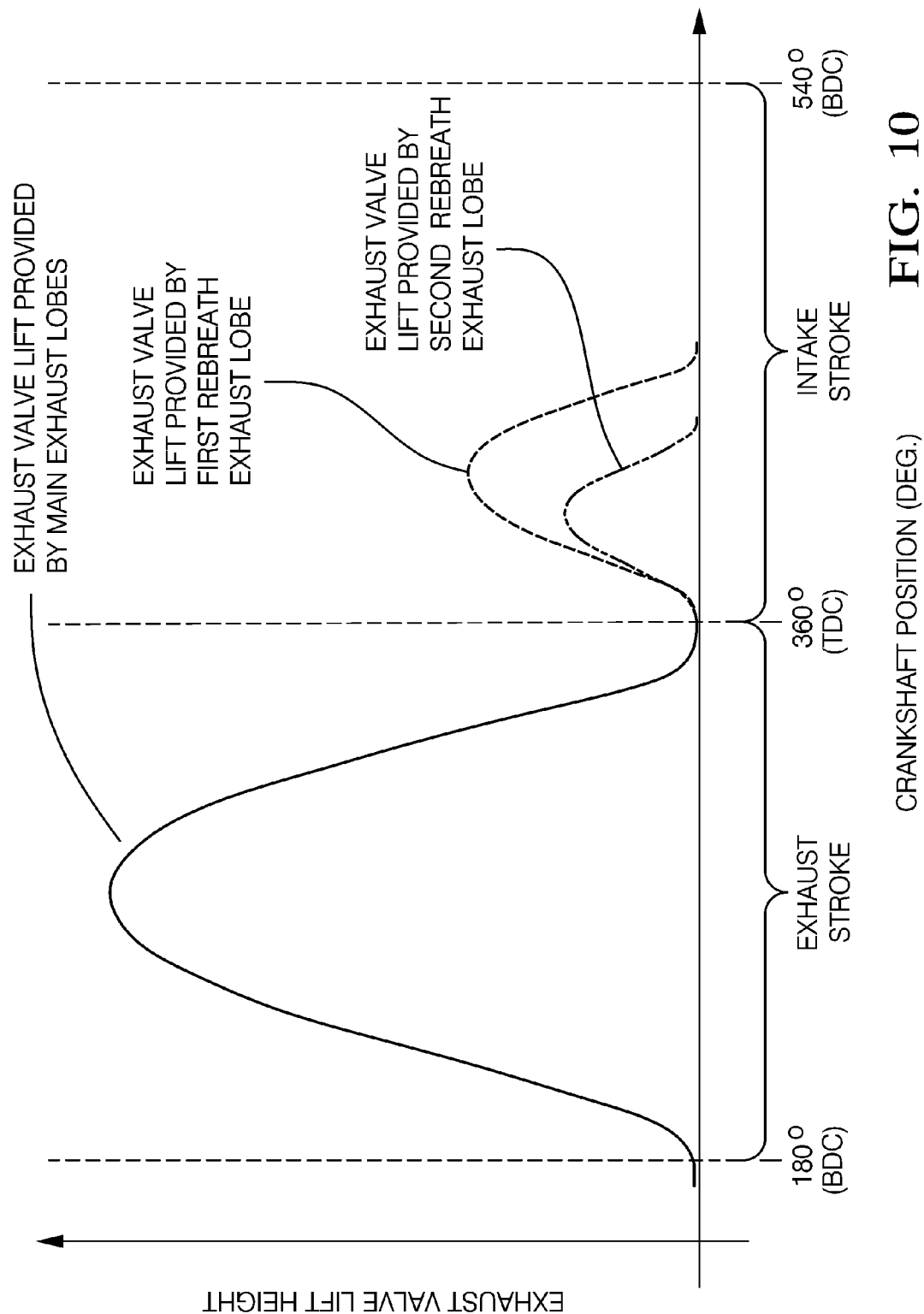
FIG. 10 is a graph showing the exhaust valve lift height of two exhaust valves of a combustion chamber that have different rebreath lobe profiles.

First and second center exhaust rebreath lobes 70, 72 may be substantially the same such that first and second exhaust valves 28, 30 are in the open position for the same duration of time, are opened to the same height from their respective exhaust valve seats 32, 34, and contact their respective exhaust valve seats 32, 34 at the same time. However, first and second center exhaust rebreath lobes 70, 72 may preferably be substantially different. More specifically, first and second center exhaust rebreath lobes 70, 72 may differ from each other in that they cause one of the first and second exhaust valves 28, 30 to be in the exhaust open position for a longer duration of time than the other of the first and second exhaust valves 28, 30. Additionally or alternatively, first and second center exhaust rebreath lobes 70, 72 may differ from each other in that they may cause one of the first and second exhaust valves 28, 30 to open to a height from its respective exhaust valve seat 32, 34 that is different from the height the other of the first and second exhaust valves 28, 30 is opened from is respective exhaust valve seat 32, 34. Also additionally or alternatively, first and second center exhaust rebreath lobes 70, 72 may differ from each other in that they cause one of the first and second exhaust valves 28, 30 comes into contact with its respective exhaust valve seat 32, 34 at a different time than when the other of the first and second exhaust valves 28, 30 comes into contact with its respective exhaust valve seat 32, 34. FIG. 10 is a graph illustrating the valve lift heights of first and second exhaust valves 28, 30 in the arrangement of this embodiment.

As should now be clear, the ability to independently place first and second two-step exhaust devices 78, 80 in the motion transmitting and motion preventing positions in conjunction with providing first and second center exhaust rebreath lobes 70, 72 that are substantially different from each other allows for four discrete levels of exhaust rebreath. First, when both first and second two-step exhaust devices 78, 80 are placed in the motion preventing position, there will be no exhaust rebreath which is the first level of exhaust rebreath. Second, when first exhaust two-step exhaust device 78 is placed in the motion transmitting position while second exhaust two-step device 80 is placed in the motion preventing position, a second level of exhaust rebreath is provided which is greater than the first level of exhaust rebreath. Third, when first exhaust two-step device 78 is placed in the motion preventing position while second exhaust two-step device 80 is placed in the motion transmitting position, a third level of exhaust rebreath is provided which is also greater than the first level of exhaust rebreath. The third level of exhaust rebreath may be more or less than the second level of exhaust rebreath depending on which of the center exhaust rebreath lobes 70, 72 allows more exhaust constituents into combustion chamber 14. Fourth, when both first and second two-step exhaust devices 78, 80 are placed in the motion transmitting position, a fourth level of exhaust rebreath is provided. The fourth level of exhaust rebreath is more than either the second or third levels provide individually.

Figure 11:
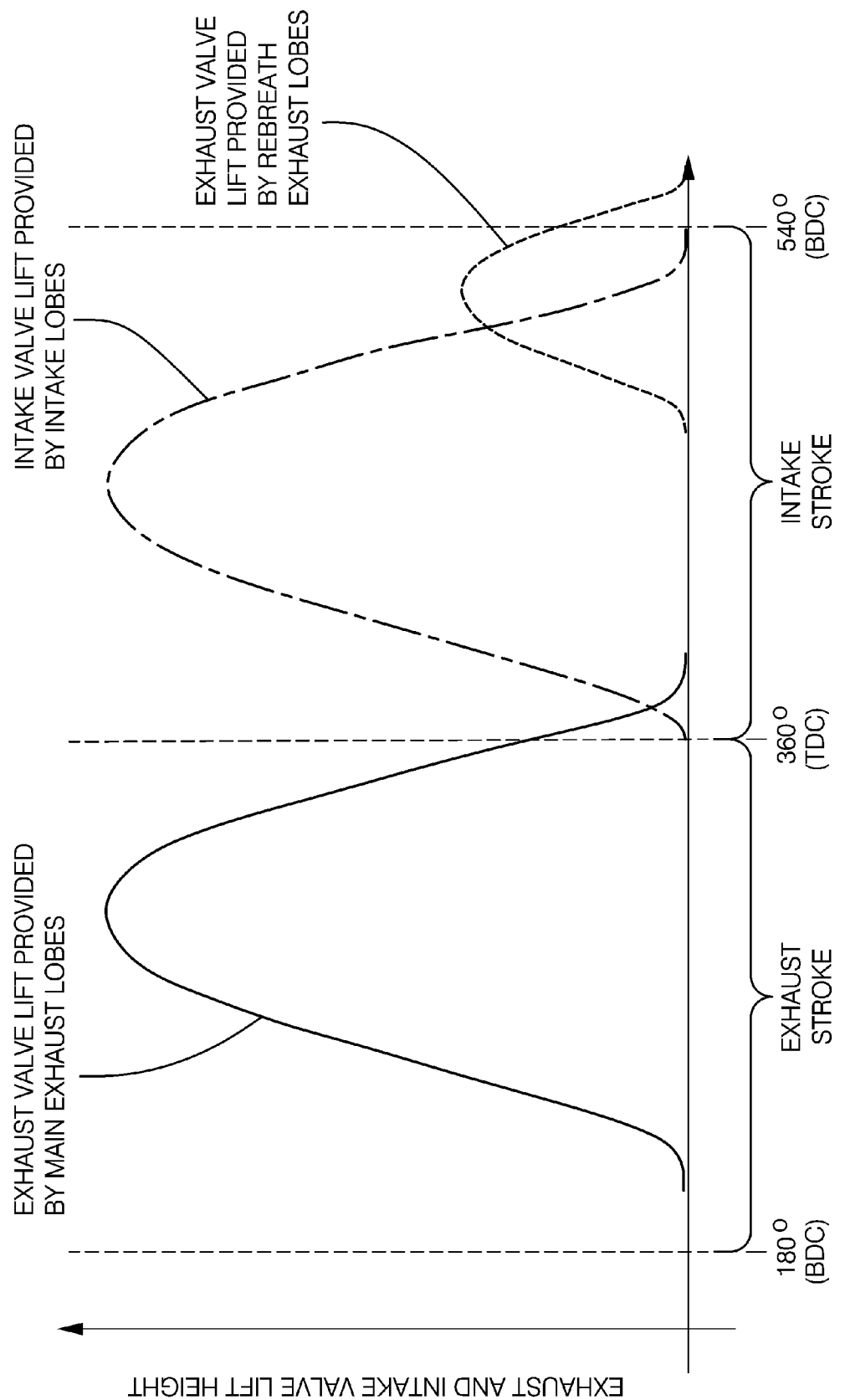
FIG. 11 is a graph showing the exhaust valve lift height and the intake valve lift height lobe when a camshaft phaser has been used to vary the phase relationship between the crankshaft and the exhaust camshaft to cause the exhaust valve to remain open after the intake stroke.

Exhaust camshaft 68 may be provided with exhaust camshaft phaser 94 for varying the phase relationship between exhaust camshaft 68 and crankshaft 18. Exhaust camshaft phaser 94 may be actuated by pressurized oil from oil supply 62 which is controlled by exhaust phasing oil control valve 96. Alternatively, but not shown, exhaust camshaft phaser 94 may be actuated by an electric motor rather than pressurized oil. Using exhaust camshaft phaser 94 to vary the phase relationship between exhaust camshaft 68 and crankshaft 18 allows varying amounts of exhaust constituents to be introduced into combustion chamber 14 through first and second exhaust valves 28, 30. This is accomplished by adjusting the phase relationship between exhaust camshaft 68 and crankshaft 18 such that first and second exhaust valves 28, 30 remain in the exhaust open position after the intake stroke is complete. In other words, first and second exhaust valves 28, 30 remain in the exhaust open position when piston 16 is moving toward the top dead center position after the intake stroke is complete. In this way, exhaust constituents can no longer be introduced into combustion chamber 14 because the movement of piston 16 is acting to push contents of combustion chamber 14 out through first and second exhaust valves 28, 30. FIG. 11 is a graph illustrating the valve lift heights of first and second exhaust valves 28, 30 and first and first and second intake valves 20, 22 in the arrangement of this embodiment. By using exhaust camshaft phaser 94 to adjust the amount of time first and second exhaust valves 28, 30 are open during the intake stroke, greater control over the amount of exhaust constituents introduced into combustion chamber 14 can be realized compared to the discrete steps provided when only using first and second two-step exhaust devices 78, 80 (rebreath only by first exhaust valve 28, rebreath only by second exhaust valve 30, or rebreath by both first and second exhaust valves 28, 30)

Exhaust camshaft phaser 94 may also be used during a cold start of GDCI internal combustion engine 10 to simultaneously advance the time first and second exhaust valves 28, 30 are opened by first and second outer main exhaust lobe pairs 74, 76. This causes early blowdown of the cylinder contents and increases exhaust temperatures during the cold start for rapid heating of catalysts in the exhaust system. When exhaust camshaft phaser 94 is in the advanced position, first and second center exhaust rebreath lobes 70, 72 would be positioned such that a maximum amount of exhaust rebreath is obtained. This promotes autoignition for the coldest conditions while simultaneously providing the highest exhaust temperatures. As GDCI internal combustion engine 10 warms up, exhaust camshaft phaser 94 would be retarded and exhaust rebreath levels would be decreased. Exhaust camshaft phasers that actuate using electric motors may be preferred for this strategy, for example, because of their high phase rate capability at low temperatures compared to exhaust camshaft phasers actuated by pressurized oil.

While GDCI internal combustion engine 10 has been illustrated as an in-line, four cylinder engine with two intake valves and two exhaust valves per cylinder, it should now be understood that other arrangements are also possible. For example internal combustion engines with other quantities of cylinders as well as internal combustion engines with include two banks of cylinders commonly referred to as "V" type arrangements. It should also now be understood that other quantities of intake and exhaust valves for each cylinder may be used, for example, one intake valve and one exhaust valve. Furthermore, the present invention may also be used in internal combustion engines that do not use the GDCI combustion strategy, for example, but not limited to, internal combustion engines which use diesel for the fuel, and gasoline engines that operate with homogeneous charge compression ignition (HCCI).

While this invention has been described in terms of preferred embodiments thereof, it is not intended to be so limited, but rather only to the extent set forth in the claims that follow.

We claim:

1. A valve train system for an internal combustion engine having a combustion chamber with a piston which reciprocates therewithin between a top-dead-center position and a bottom-dead-center position, said valve train system comprising:
    an intake valve which moves between an intake closed position and an intake open position and which allows a charge of at least air into said combustion chamber in said intake open position, wherein said intake valve is seated against an intake valve seat in said intake closed position and said intake valve is separated from said intake valve seat in said intake open position;
    an exhaust valve which moves between an exhaust closed position and an exhaust open position and which either expels exhaust constituents from said combustion chamber or selectively allows exhaust constituents into said combustion chamber in said exhaust open position, wherein said exhaust valve is seated against an exhaust valve seat in said exhaust closed position and said exhaust valve is separated from said exhaust valve seat in said exhaust open position;
    a camshaft with a main exhaust lobe which moves said exhaust valve between said exhaust closed position and said exhaust open position which expels exhaust constituents from said combustion chamber and an exhaust rebreath lobe which moves said exhaust valve between said exhaust closed position and said exhaust open position which allows exhaust constituents into said combustion chamber; and
    a two-step device which transmits motion from said camshaft to said exhaust valve and which switches between a motion transmitting position which transmits motion from said main exhaust lobe and said exhaust rebreath lobe to said exhaust valve and a motion preventing position which prevents for motion from being transmitted from said exhaust rebreath lobe to said exhaust valve and which transmits motion from said main exhaust lobe to said exhaust valve;
    wherein, when said two step device is in said motion transmitting position, said exhaust rebreath lobe moves said exhaust valve away from said exhaust valve seat when said intake valve is in said intake open position, and said intake valve is at least one of moving away from said Intake valve seat or moving toward said intake valve seat.

2. A valve train system as in claim 1 further comprising:
    a second exhaust valve which moves between an exhaust closed position and an exhaust open position which either expels exhaust constituents from said combustion chamber or which selectively allows exhaust constituents into said combustion chamber, wherein said second exhaust valve is seated against a second exhaust valve seat in said exhaust closed position and said second exhaust valve is separated from said second exhaust valve seat in said exhaust open position, and wherein said camshaft has a second main exhaust lobe which moves said second exhaust valve between said exhaust closed position and said exhaust open position which expels exhaust constituents from said combustion chamber and a second exhaust rebreath lobe which moves said second exhaust valve between said exhaust closed position and said exhaust open position which allows exhaust constituents into said combustion chamber; and
    a second two-step device which transmits motion from said camshaft to said second exhaust valve and which switches between a motion transmitting position which transmits motion from said second main exhaust lobe and said second exhaust rebreath lobe to said second exhaust valve and a motion preventing position which prevents motion from being transmitted from said second exhaust rebreath lobe to said second exhaust valve and which transmits motion from said second main exhaust lobe to said second exhaust valve;
    wherein, when said second two-step device is in said motion transmitting position, said second exhaust rebreath lobe moves said second exhaust valve away from said second exhaust valve seat only when said intake valve is in said intake open position.

3. A valve train system as in claim 2 wherein said two-step device and said second two-step device are independently switched between said motion transmitting and motion preventing positions.

4. A valve train system as in claim 2 wherein said exhaust rebreath lobe has a different profile than said second exhaust rebreath lobe.

5. A valve train system as in claim 4 wherein said exhaust rebreath lobe opens said exhaust valve to a first height and said second exhaust rebreath lobe opens said second exhaust valve to a second height that is different than said first height.

6. A valve train system as in claim 4 wherein said exhaust rebreath lobe opens said exhaust valve for a first time duration and said second exhaust rebreath lobe opens said second exhaust valve for a second time duration that is different than said first time duration.

7. A valve train system as in claim 2 wherein said second exhaust rebreath lobe moves said second exhaust valve away from said second exhaust valve seat only when said piston is moving toward said bottom-dead-center position.

8. A valve train system as in claim 1 wherein said exhaust rebreath lobe moves said exhaust valve away from said exhaust valve seat when said piston is moving toward said bottom dead center position.

9. A valve train system as in claim 8 wherein the phase relationship of said exhaust rebreath lobe with said piston is variable in order to vary the time said exhaust valve is open while said piston is moving toward said bottom dead center position, thereby varying the amount of exhaust constituents allowed into said combustion chamber.

10. A valve train system as in claim 1 further comprising a camshaft phaser which varies the phase relationship of said exhaust rebreath lobe with said piston in order to vary the time said exhaust valve is open during the intake stroke of said internal combustion engine, thereby varying the time said exhaust valve is open after the intake stroke.

11. A valve train system as in claim 1 wherein said motion transmitting position is a default position of said two-step device.

12. A valve train system as in claim 1 wherein said exhaust rebreath lobe moves said exhaust valve away from said exhaust valve seat only when said piston is moving toward said bottom-dead-center position.

* * * * *